(12) United States Patent
Jun et al.

(10) Patent No.: US 9,276,403 B2
(45) Date of Patent: Mar. 1, 2016

(54) SOLAR CELL HAVING FAN STRUCTURE AND APPLICATION SYSTEM USING THE SAME

(71) Applicant: Electronics and Telecommunications Research Institute, Daejeon (KR)

(72) Inventors: Dong Suk Jun, Daejeon (KR); In-Kyu You, Daejeon (KR); Je Ha Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 421 days.

(21) Appl. No.: 13/788,048

(22) Filed: Mar. 7, 2013

(65) Prior Publication Data

US 2013/0342153 A1 Dec. 26, 2013

(30) Foreign Application Priority Data

Jun. 25, 2012 (KR) .................. 10-2012-0067893

(51) Int. Cl.
| | | |
|---|---|---|
| H01M 10/46 | (2006.01) | |
| H02J 1/00 | (2006.01) | |
| B01D 53/02 | (2006.01) | |
| H02J 7/00 | (2006.01) | |
| B01D 53/04 | (2006.01) | |
| B01D 53/62 | (2006.01) | |

(52) U.S. Cl.
CPC . *H02J 1/00* (2013.01); *B01D 53/02* (2013.01); *B01D 53/0407* (2013.01); *B01D 53/62* (2013.01); *H02J 7/00* (2013.01); *B01D 2257/504* (2013.01); *Y02C 10/04* (2013.01); *Y02C 10/06* (2013.01); *Y02C 10/08* (2013.01)

(58) Field of Classification Search
USPC .......................................................... 320/101
See application file for complete search history.

(56) References Cited

U.S. PATENT DOCUMENTS

| | | | |
|---|---|---|---|
| 2007/0199560 A1* | 8/2007 | Hobbs et al. ................. 126/600 |
| 2010/0068801 A1* | 3/2010 | Woods et al. .............. 435/292.1 |
| 2010/0194334 A1* | 8/2010 | Kirby et al. .................. 320/108 |
| 2010/0237785 A1* | 9/2010 | Lee .............................. 320/101 |
| 2012/0047826 A1 | 3/2012 | Chang et al. |

FOREIGN PATENT DOCUMENTS

KR 10-2011-0017535 A 2/2011

* cited by examiner

*Primary Examiner* — Robert Grant
(74) *Attorney, Agent, or Firm* — Rabin & Berdo, P.C.

(57) ABSTRACT

Disclosed are a solar cell having a fan structure that provides a more pleasant life, convenience, and stability by forming, in a fan structure, a flexible color solar cell applied with a carbon dioxide absorption material, and configuring the formed flexible color solar cell through convergence of information technology, and an electronic application apparatus using the same. The electronic application apparatus using a solar cell as a power source includes: an application device body portion including a both side supporter fixed to ground, a transmitter including an antenna capable of transmitting power and data, and a data screen to thereby provide a predetermined service; and the solar cell provided in an upper end of the application device body portion, to color using a predetermined wavelength of light, and to perform solar power generation using a remaining wavelength of light.

9 Claims, 6 Drawing Sheets

SOLAR CELL HAVING FAN STRUCTURE AND APPLICATION SYSTEM USING THE SAME

CROSS-REFERENCE TO RELATED APPLICATIONS

This application is based on and claims priority from Korean Patent Application No. 10-2012-0067893, filed on Jun. 25, 2012, with the Korean Intellectual Property Office, the disclosure of which is incorporated herein in its entirety by reference.

TECHNICAL FIELD

The present disclosure relates to a solar cell having a fan structure and an electronic application apparatus using the same, and more particularly, to a solar cell having a fan structure that provides a more pleasant life, convenience, and stability by forming, in a fan structure, a flexible colourcolour solar cell applied with a carbon dioxide absorption material, and configuring the formed flexible colourcolour solar cell through convergence of information technology, and an electronic application apparatus using the same.

BACKGROUND

An existing solar cell is packaged with a rigid glass panel and thus, is in a passive form to generate energy using light incident from outside. The existing solar cell needs to meet an aesthetic condition with respect to the beauty of a city or an environment and also needs to adjust a discharging amount of oxygen by absorbing carbon dioxide just like photosynthesis of the plants. For the above purpose, it was general to absorb carbon dioxide and thereby adjust an amount of carbon dioxide using roadside trees, an urban forest, and the like. Application facility using the solar cell as a power source was provided simply only in a form of an advertising board, a light emitting diode (LED) lamp, and the like.

SUMMARY

The present disclosure has been made in an effort to provide an environment-friendly electronic application apparatus by converging a solar cell and information technology.

The present disclosure also provides a pleasant environment for a user who uses an electronic device integrated with a solar cell since a solar cell portion absorbs carbon dioxide.

An exemplary embodiment of the present disclosure provides a solar cell having a fan structure, including: a solar cell panel to colour using a predetermined wavelength of light, and to perform solar power generation using a remaining wavelength of light. At least two solar cell panels are spaced apart from each other and thereby are disposed in a fan structure for a venturi effect, a carbon dioxide absorption material is applied on the surface on which the at least two solar cell panels face each other, exterior air flows into a gap space of the fan structure, and carbon dioxide of the in-flown outside air is absorbed by the carbon dioxide absorption material.

Another exemplary embodiment of the present disclosure provides an electronic application apparatus that uses a solar cell as a power source, the apparatus including: an application device body portion including a both side supporter fixed to ground, a transmitter including an antenna capable of transmitting power and data, and a data screen to thereby provide a predetermined service; and the solar cell provided in an upper end of the application device body portion, to colour using a predetermined wavelength of light, and to perform solar power generation using a remaining wavelength of light.

According to the exemplary embodiments of the present disclosure, it is possible to achieve the effect such as reduction in an amount of carbon dioxide in the air by forming a solar cell applied with a carbon dioxide absorption material in a fan structure.

According to the exemplary embodiments of the present disclosure, an electronic application apparatus of a self-charging scheme using sunlight does not use wire and thus, may prevent a safety accident that may occur due to the wire and the like. The electronic application contributes to an environment-friendly activity by using the sunlight that is a clean energy resource, and achieves the economical effect by not requiring a separate power cost.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be used, and other changes may be made, without departing from the spirit or scope of the subject matter presented here.

Figure 1:
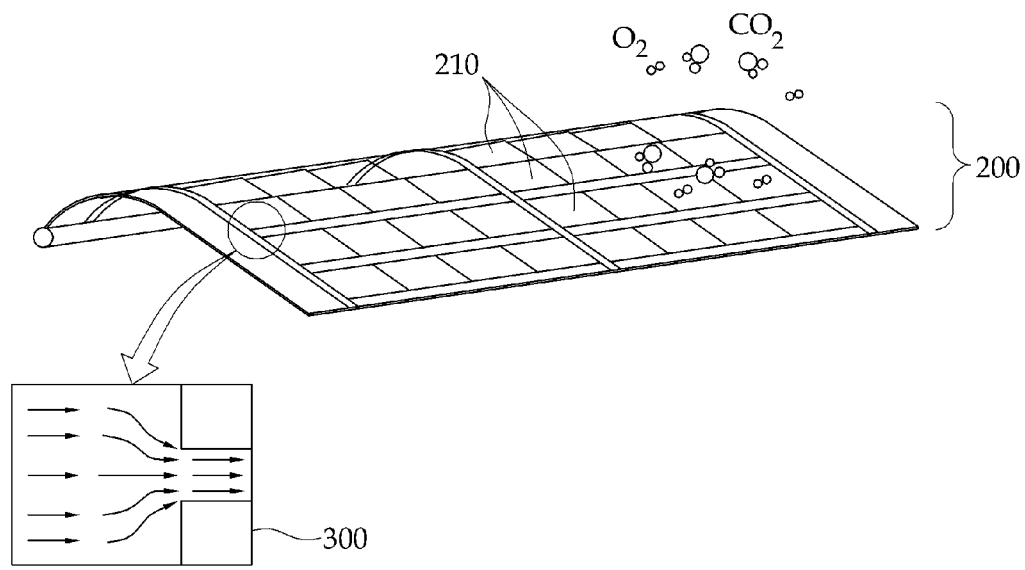
FIG. 1 is a diagram illustrating a flexible colourcolour solar cell having a fan structure according to an exemplary embodiment of the present disclosure.

FIG. 1 is a diagram illustrating a flexible colourcolour solar cell having a fan structure according to an exemplary embodiment of the present disclosure.

Initially, a flexible colourcolour solar cell panel 210 transmits and reflects a predetermined wavelength of sunlight. And the flexible colourcolour solar cell panel 210 performs solar power generation by using a remaining wavelength of the sunlight that is not transmitted or not reflected. Here, the flexible colourcolour solar cell panel 210 may use a dye-sensitized solar cell (DSSC) and an organic photovoltaic cell (OPV) using photoelectrochemical reaction, or may use a solar cell packaged within a tempered glass panel having a partially translucent property by adjusting a thickness or an area of a light absorbing layer. That is, a solar cell having a characteristic that light having a translucent property is partially transmitted may be used in the present exemplary embodiment. When using the flexible colourcolour solar cell panel 210 having uniform transmissivity and penetration wavelength characteristic over the entire area, it is possible to provide a uniform sunshine condition within an application system compared to an existing solar cell in which cells are arranged at predetermined intervals.

A flexible colourcolour solar cell portion 200 has a structure in which at least two flexible colourcolour solar cell panels 210 are spaced apart from each other and thereby are disposed in a fan structure 300 for a venturi effect, and a carbon dioxide absorption material is applied on the surface on which the at least two flexible colourcolour solar cell panels 210 face each other to absorb carbon dioxide in exterior air that flows into a gap space of the fan structure 300.

In this instance, when a DSSC is used for the flexible colourcolour solar cell portion 200, electricity is produced using an electrochemical principle instead of using pn junction semiconductor and an n-type semiconductor such as an existing silicon solar cell or thin film solar cell. Accordingly, the DSSC may achieve high theoretical efficiency and environment-friendly effect.

Accordingly, the flexible colourcolour solar cell portion 200 may be formed by disposing at least one flexible colourcolour solar cell panel 210 using the DSSC to be in a linear, curved, picture, or character shape.

The above DSSC is configured by connecting at least one DSSC, and produces power using sunlight or indoor light. Here, a structure and a power generation principle of the DSSC will be described with reference to FIG. 2.

Figure 2:
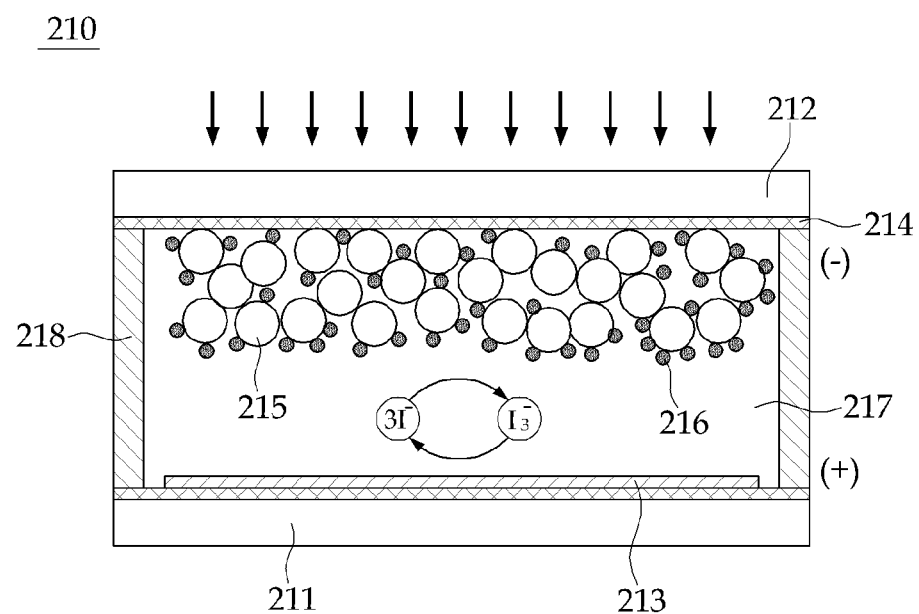
FIG. 2 is a diagram to describe a structure and a power generation principle of a dye-sensitized solar cell (DSSC).

Referring to FIG. 2, the DSSC, as a cell of a concept similar to a photosynthesis principle of the plants, is a solar cell that includes a photosensitive dye molecule 216 absorbing light, an operational electrode 215 in a nano-particle structure to support the photosensitive dye molecule 216, an electrolyte 217, and a catalytic target electrode 213.

Specifically, the DSSC is formed in a simple structure in which the operational electrodes 215 in the nano-particle structure onto which predetermined dye molecules 216 are adhered and the electrolytes 217 are filled between two glass substrates 211 and 212, each attached with a transparent electrode film 214. When the dye molecule 216 receives sunlight or indoor light to give out an electron like chlorophyll of the plants, the electron consumes energy of the electron while flowing along an external circuit and thereby reaches the target electrode 213.

In this instance, since the electron gets out of the dye molecule 216 of the operational electrode 215, a single electron is supplied again from an ion within the electrolyte 217 to the dye molecule 216 and the electron returned from outside to the target electrode 213 is transferred again to the ion within the electrolyte 217. Accordingly, an energy transfer process is consecutively performed.

The above processes generally follow electrochemical reaction that is performed between the operational electrode 215 and the electrolyte 217, and between the target electrode 213 and the electrolyte 217. Accordingly, as a contact area between an electrode and an electrolyte increases, many reactions may quickly proceed. As a surface area of the operational electrode 215 becomes wider, a large amount of dye molecules 216 may be adhered onto the surface of the operational electrode 215 and thus, an amount of producible power may increase. Accordingly, a nano particle is used for a material of each of the target electrode 213 and the operational electrode 215. Since a surface area of a material significantly increases in the same volume, it is possible to attach a large amount of dye molecules 216 onto the surface, and to increase a speed of the electrochemical reaction between each of the target electrode 213 and the operational electrode 215 and the electrolyte 217. Accordingly, it is possible to easily adjust transmissivity by adjusting a type and concentration of a dye absorbed by an electrode, or by changing a type and a thickness of an electrode layer. Even in an amorphous silicon solar cell using a transparent substrate such as glass and the like, it is possible to configure a colourcolour by adjusting a thickness of an absorbing layer in which light is absorbed, or by applying, on the particle surface, a material that reflects a predetermined wavelength of light. By disposing the flexible colourcolour solar cell panels 210 at a predetermined interval, it is possible to overall adjust the transmissivity of light.

As described above, in the DSSC, generation of an electron through absorption of light is performed in a dye, and an oxide semiconductor, such as titanium dioxide used for an electrode, simply functions to move the generated electron to a current collector including a conductor. Accordingly, it is possible to obtain a printable flexible colourcolour property. The wavelength range in which light is absorbed to thereby generate an electron varies based on a dye to be used and thus, it is possible to select a wavelength.

That is, in the flexible colourcolour solar cell panel 210, it is possible to adjust a wavelength to be transmitted by only changing a dye to be absorbed by an oxide semiconductor such as $TiO_2$. By changing a type and a thickness of an electrode layer, a type and concentration of a dye, and the like, it is also possible to change transmissivity. A wavelength used for power generation in which the DSSC generates electricity may vary based on the used dye.

For example, the flexible colourcolour solar cell panel 210 may use light of a wavelength between 400 nm and 600 nm for solar power generation, and may transmit light of a remaining wavelength. Alternatively, the flexible colourcolour solar cell panel 210 may use light of a wavelength between 600 nm and 800 nm for solar power generation, and may transmit light of a remaining wavelength. The flexible colourcolour solar cell panel 210 may adjust the transmissivity to be less than 40% in the wavelength of 600 nm, or may adjust the transmissivity to be greater than or equal to 40% in the wavelength of 600 nm.

Table 1 shows a wavelength for each colourcolour light.

TABLE 1

| ColourColour light | Wavelength (unit: nm) |
|---|---|
| Red light | 660 |
| Ultra red light | 730 |
| Blue light | 450 |
| Green light | 530 |
| Yellow light | 570 |

Figure 3:
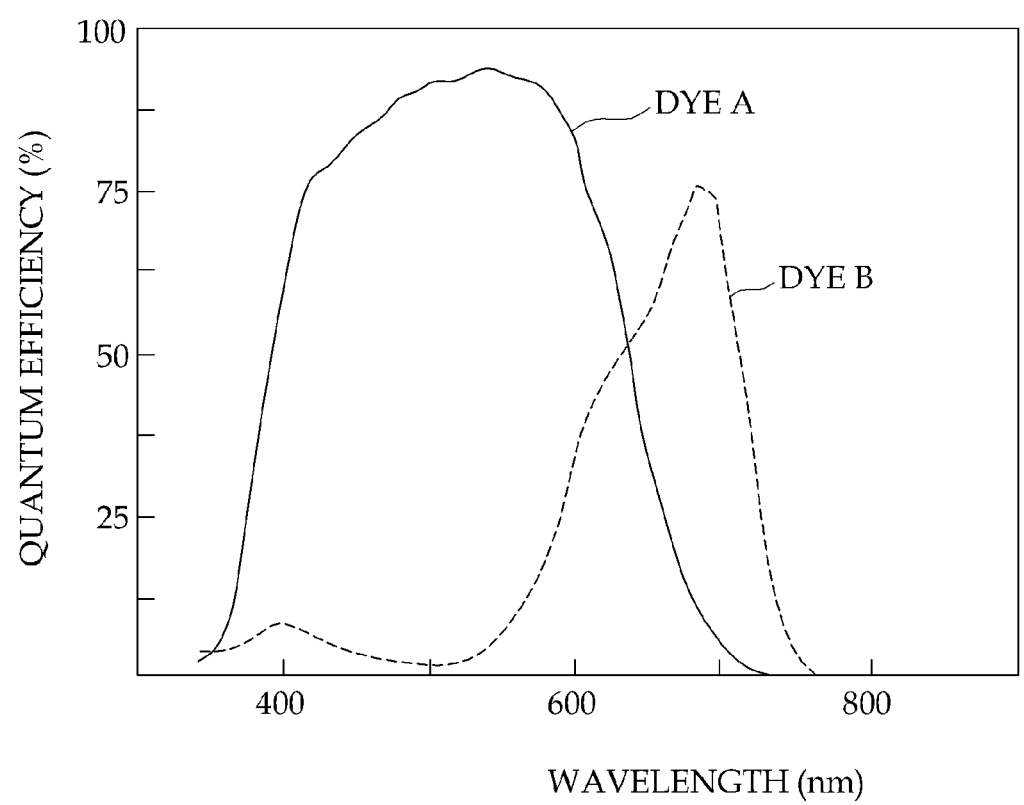
FIG. 3 is a graph illustrating an example of an optical wavelength varying based on a dye used for a dye-sensitized flexible colourcolour solar cell.

FIG. 3 is a graph illustrating an example of an optical wavelength varying based on a dye used for a DSSC according to an exemplary embodiment of the present disclosure.

Referring to FIG. 3, it can be known that the wavelength range in which quantum efficiency according to a dye A appears is different from the wavelength range in which quantum efficiency according to a dye B appears. The dye A may be used in a circumstance in which light of the wavelength between 400 nm and 600 nm is absorbed and thereby is used for solar power generation and light of a remaining wavelength needs to be transmitted, and the dye B may be used in a circumstance in which light of the wavelength between 600 nm and 800 nm is absorbed and thereby is used for solar power generation and light of a remaining wavelength needs to be transmitted. That is, by adjusting a type and concentration of a dye used for the solar cell, it is possible to vary a wavelength to be transmitted and the like.

Figure 4A:
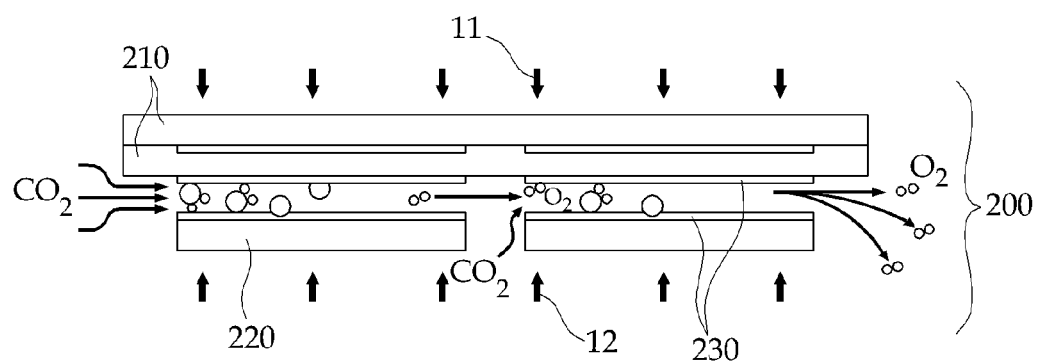
FIGS. 4A and 4B are cross-sectional views of the flexible colourcolour solar cell of FIG. 1.
Figure 4B:
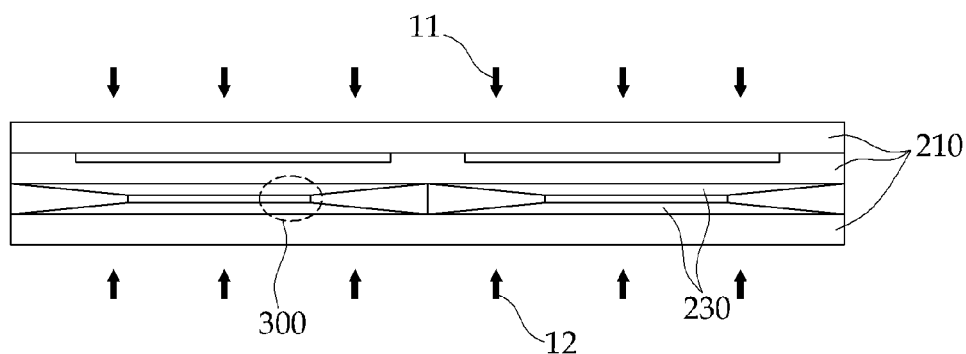

FIG. 4A illustrates an example of a cross-sectional view of the flexible colour solar cell of FIG. 1, and FIG. 4B illustrates an example to describe a structure of a fan air inlet of the flexible colour solar cell of FIG. 1.

As illustrated in FIG. 4, in the flexible colour solar cell portion 200, sunlight 11 transfers energy from the sun to the flexible colour solar cell panel 210, and the flexible colour solar cell panel 210 is mixed with a transparent material 220 such as glass to thereby constitute the flexible colour solar cell portion 200. The flexible colour solar cell portion 200 has a structure in which at least two flexible colour solar cell panels 210 are spaced apart from each other and thereby disposed in the fan structure 300 for a venturi effect, a carbon dioxide absorption material 230 is applied on the surface on which the at least two flexible colour solar cell panels 210 face each other, exterior air flows into a gap space of the fan structure 300, and carbon dioxide of the in-flown outside air is absorbed by the carbon dioxide absorption material 230 to thereby discharge oxygen.

The carbon dioxide absorption material 230 uses a nano (nm) particle of gas absorption paint that includes zeolite, ceramic fiber (aluminum oxide-silica dioxide fiber, aluminum oxide fiber, silica dioxide fiber, and the like), organic fiber (cellulose fiber, silk fiber, polypropylene fiber, and the like), inorganic additives (sepiolite, silica, alumina, and the like), organic additives (polyethylene glycol, polyethylene oxide, sodium carboxymethyl cellulose, polyvinyl acetate, and the like), inorganic coagulants (aluminum sulfate, aluminum chloride, iron chloride, iron sulfate poly aluminum chloride, poly aluminum sulfate, and the like), organic coagulants (cationic starch, polydiallydi methyl ammonium, cationic polyacrylamide, and the like). Air including carbon dioxide and air pollutant flows in between absorption materials. By install the fan structure 300 using solar heat by the sunlight, geothermal heat coming from the ground, reflective solar heat 12, and the venturi effect, it is possible to reduce an amount of carbon dioxide in the air.

Figure 5:
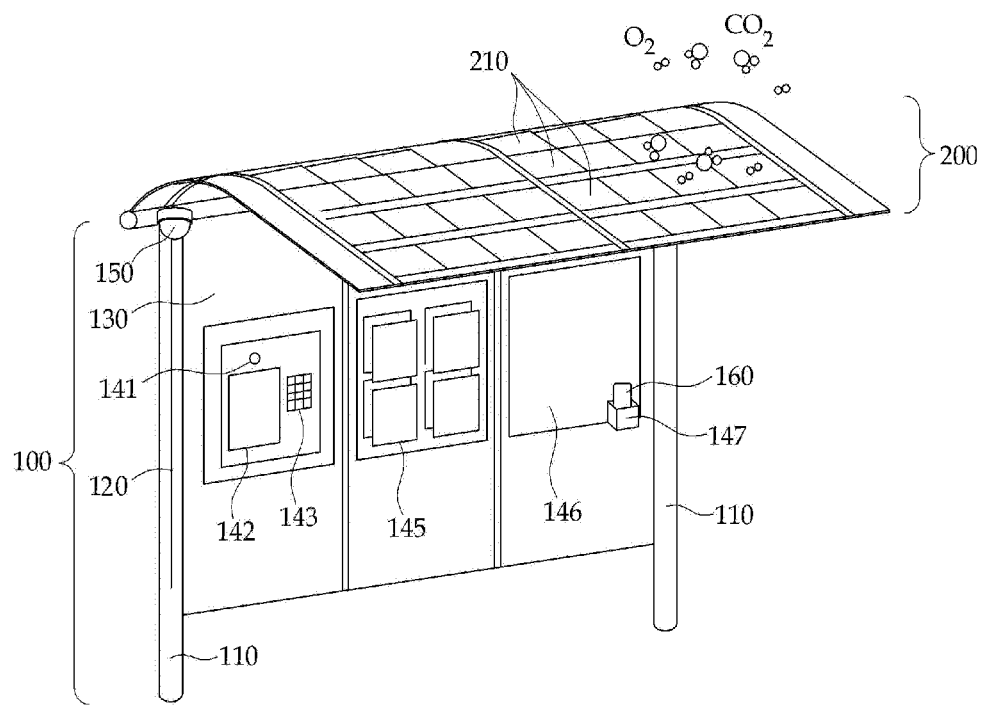
FIG. 5 is a diagram illustrating the schematic appearance of an electronic application apparatus using a solar cell according to an exemplary embodiment of the present disclosure.

FIG. 5 illustrates an example of an electronic application apparatus that uses the above-described flexible colour solar cell as a power source.

Referring to FIG. 5, the electronic application apparatus that uses the flexible colour solar cell as the power source includes an application device body portion 100 and the flexible colour solar cell portion 200 including a storage battery 120.

The application device body portion 100 includes a both side supporter 110 fixed to outdoor ground, a transmitter including an antenna capable of transmitting power and data, and a data screen 130, and thereby functions to provide a predetermined service.

The flexible colour solar cell portion 200 is provided in an upper end of the application device body portion 100, and functions to configure a colour using a predetermined wavelength of light, and to perform solar power generation using a remaining wavelength of light. The flexible colour solar cell portion 200 uses herein, as the flexible colour solar cell panel 210, the flexible colour solar cell that is described above with reference to FIGS. 1 through 3.

As described above, the flexible colour solar cell panel 210 is applied with the carbon dioxide absorption material 230 to thereby enable the air including carbon dioxide and air pollutant to flow in between absorption materials, and has the fan structure 300 for the venturi effect. Through the above structure, it is possible to provide a pleasant environment to a user who uses the electronic application apparatus.

To enable the electronic application apparatus to be available during the dark night, the electronic application apparatus may additionally include an LED lighting 150 having a structure in which power consumption is small and heat is easily emitted.

The application device body portion 100 may include a transmitting and receiving apparatus (not illustrated) including an antenna, a web camera 141 that supports two-way communication of sound and a moving picture, and photographing of the moving picture, a screen 142 for a video call, a keypad 143 for a wireless call, the transparent screen 130, an advertising board 145, an electronic bulletin board 146, a power transmission interface 147, and the like. By including the above electronic devices, it is possible to provide a predetermined service to a user through communication with an external electronic device, an external server, or a user terminal 160.

Figure 6A:
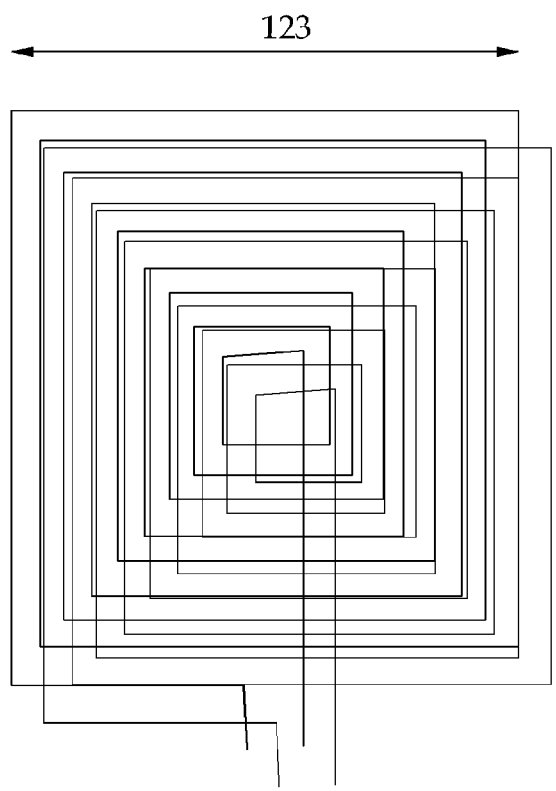
FIGS. 6A and 6B are structural diagrams of an antenna to be installed in an electronic application apparatus using a solar cell according to an exemplary embodiment of the present disclosure.
Figure 6B:
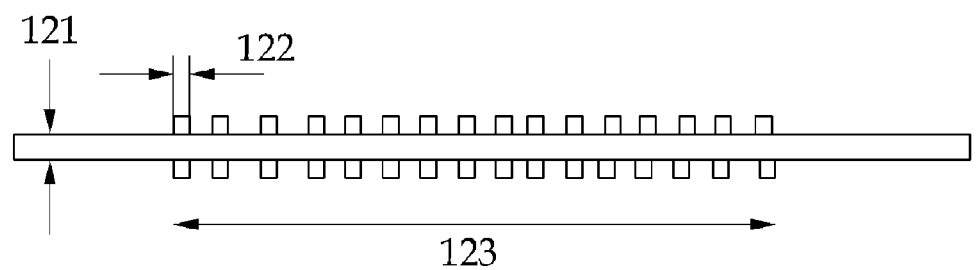

The antenna used herein may function as a power source, or may perform data transmission and reception with the power source. FIGS. 6A and 6B illustrate an example of an antenna structure according to an exemplary embodiment of the present disclosure. An antenna according to an exemplary embodiment of the present disclosure has small, highly efficient, narrow band, and non-radiative characteristics, and uses various frequency bands such as 600 GHz, millimeter wave, terahertz wave, and the like, in order to wirelessly transmit power and to transmit a large amount of data at a high rate.

The structure of the antenna includes a pair of spirals p and q for transmission and reception, respectively. Matching is considered by adjusting an interval 121 between the spirals p and q, and a spiral diameter 122 is set to be less than or equal to $1/10000$ wavelength, and a current amount is adjusted by adjusting a spiral width 123.

Figure 7:
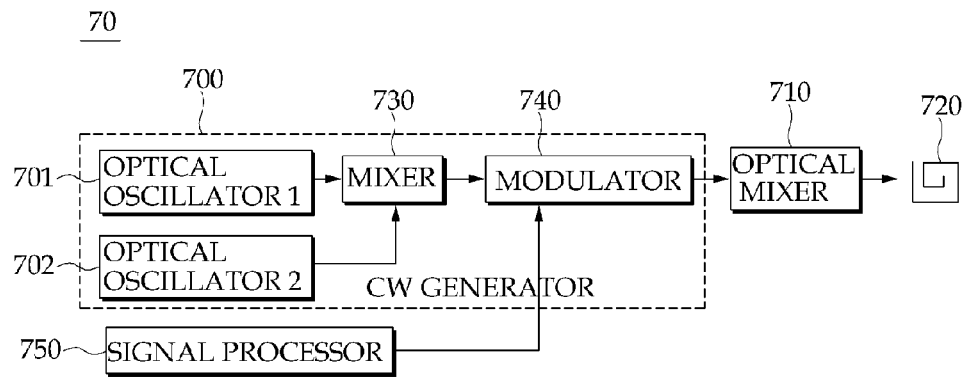
FIG. 7 is a configuration diagram of a transmitter to be installed in an electronic application apparatus using a solar cell according to an exemplary embodiment of the present disclosure.

Referring to FIG. 7, a transmission apparatus 70 having various frequency bands such as 60 GHz, a millimeter wave, a terahertz wave, and the like includes a CW generator 700 in which optical oscillators 701 and 702 for CW generation and a modulator 740 for modulation are integrated, and an optical mixer 710. Two optical signals having different wavelengths that are generated in the optical oscillators 701 and 702 are modulated to image data or predetermined data that is input to the modulator 740. An output of the CW generator 700 is optically mixed by an optical mixer 710 to thereby generate a modulated signal, and is ejected to the air through a transmitting antenna 720.

Figure 8:
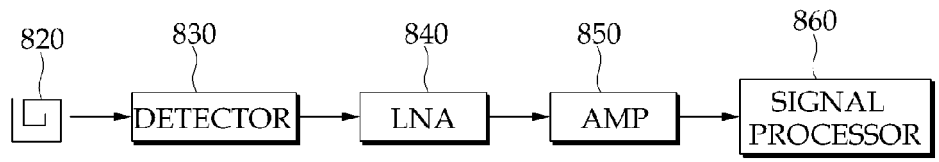
FIG. 8 is a configuration diagram of a receiver to be installed in an electronic application apparatus using a solar cell according to an exemplary embodiment of the present disclosure.

Referring to FIG. 8, a signal received by a reception apparatus according to the present disclosure passes through an antenna 820 and a detector 830 of a 60 GHz, a millimeter wave, terahertz wave receiving system and thereby is recovered to signal in a form just before passing through a transmitting antenna. However, magnitude of a signal that is output through the detector 830 is small, and an image processing module amplifies and limits the received signal using a low noise amplifier (LNA) 840 and a limiting amplifier (AMP) 850. The amplified signal is input to a signal processor 860. The input signal is finally reproduced through a transparent screen or a portable terminal of a user using the signal that is processed by the signal processor 860.

Figure 9:
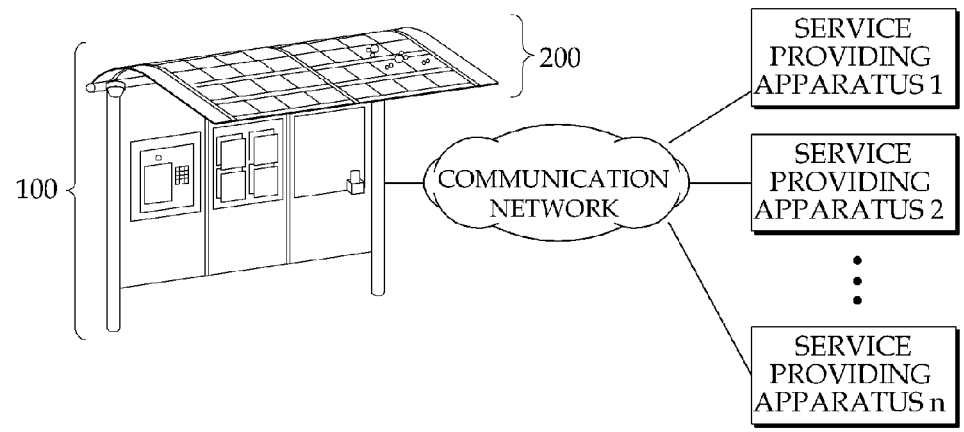
FIG. 9 is a configuration diagram to describe an example of providing, by an electronic application apparatus using a solar cell according to the present disclosure, a service to a user through an external service providing apparatus.

FIG. 9 is a configuration diagram to describe an example of providing, by an electronic application apparatus that uses, as a power source, a solar cell according to an exemplary embodiment of the present disclosure, a service to a user by transmitting and receiving information to and from an external service providing apparatus over a wireless communication network.

The electronic application apparatus that uses the solar cell as the power source may receive information by communicating with a service providing apparatus such as a traffic information server, an advertisement server, a content providing server, and the like, over the wireless communication network, and may provide information desired by a user.

For example, the electronic application apparatus that uses the solar cell as the power source receives an electronic advertisement from a connected electronic advertisement server, that is, the service providing apparatus over the wireless communication network, and displays the received electronic advertisement on the transparent screen 130.

The transparent screen 130 may include a single-face or two-face touch screen with a wireless communication function. When an advertiser accesses an advertisement server to transmit an advertisement to the electronic application apparatus through an advertisement transmitting server that transmits an advertisement through a predetermined procedure, the electronic application apparatus receives the advertisement through an antenna and displays the advertisement on the transparent screen 130. While viewing or after viewing the advertisement, the user may make a request for information about a product associated with the advertisement, or may make a payment for a selected product. Here, a touch screen of a user terminal or the electronic application apparatus may be used for a user input.

Outdoors such as a street and the like, a customer may be provided with convenience and experience through an electronic advertisement such as virtual reality, augmented reality, and the like, using the transparent screen 130 including a printable touch screen function. Without restriction on a time, the customer may obtain additional information through a touch on a product displayed on the transparent screen 130 including the printable touch screen function. An online shopping service enables the user to purchase a product using a personal terminal.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A solar cell, comprising:
   at least two solar cell panels to colour using a predetermined wavelength of light, and to perform solar power generation using a remaining wavelength of light,
   wherein the at least two solar cell panels are stacked together to form a layered structure, and include a first solar cell panel with a lower surface and an upper surface and a second solar cell panel stacked on the first solar cell, the second solar cell panel having a lower surface and an upper surface, and
   wherein, when taken from a sectional view, the second solar cell panel is disposed on the first solar cell panel such that the lower surface of the second solar cell panel faces the upper surface of the first solar cell panel, and the first and second solar cell panels are spaced apart from each other with a gap space therebetween and thereby are disposed in a fan structure for a venturi effect; and
   a first carbon dioxide absorption material applied on the upper surface of the first solar cell panel, and a second carbon dioxide absorption material applied on the lower surface of the second solar cell panel, the first and second dioxide absorption material facing each other with a gap therebetween,
   wherein exterior air flows into the gap space of the fan structure, and carbon dioxide of the in-flown outside air is absorbed by the first and second carbon dioxide absorption materials.

2. The solar cell of claim 1, wherein the solar cell panel is any one of a dye-sensitized solar cell (DSSC), an organic photovoltaic cell (OPV), an amorphous silicon solar cell, and an inorganic substance of a solar cell.

3. An electronic application apparatus that uses a solar cell as a power source, the apparatus comprising:
   an application device body portion including both side supporters fixed to ground, a transmitter including an antenna capable of transmitting power and data, and a data screen to thereby provide a predetermined service; and
   the solar cell provided in an upper end of the application device body portion,
   wherein the solar cell includes at least two solar cell panels to colour using a predetermined wavelength of light, and to perform solar power generation using a remaining wavelength of light,
   wherein the at least two solar cell panels are stacked together to form a layered structure, and include a first solar cell panel with a lower surface and an upper surface and a second solar cell panel stacked on the first solar cell, the second solar cell panel having a lower surface and an upper surface,
   wherein, when taken from a sectional view, the second solar cell panel is disposed on the first solar cell panel such that the lower surface of the second solar cell panel faces the upper surface of the first solar cell panel, and the first and second solar cell panels are spaced apart from each other with a gap space therebetween and thereby are disposed in a fan structure for a venturi effect,
   wherein the solar cell further includes a first carbon dioxide absorption material applied on the upper surface of the first solar cell panel, and a second carbon dioxide absorption material applied on the lower surface of the second solar cell panel, the first and second dioxide absorption material facing each other with a gap therebetween, and
   wherein exterior air flows into the gap space of the fan structure, and carbon dioxide of the in-flown outside air is absorbed by the first and second carbon dioxide absorption materials.

4. The apparatus of claim 3,
   wherein an application device body portion is at least one of a camera, a data receiver, a touch pad, and a light emitting diode (LED) lighting.

5. The apparatus of claim 3, further comprising:
   a storage battery to charge predetermined voltage of power that is generated in the solar cell.

6. The apparatus of claim 3, wherein the solar cell is any one of a DSSC, an OPV, an amorphous silicon solar cell, and an inorganic substance of a solar cell.

7. The apparatus of claim 3, wherein:
the antenna is configured as a pair of spirals, and
the pair of spirals includes a transmitting spiral to transmit power and data, and a receiving spiral to receive the data.

8. The apparatus of claim 3, wherein the solar cell extends from a first end to a second end, the first end is supported by the both side supporters, and the second end is an unsupported free end.

9. The solar cell of claim 1, wherein the solar cell extends from a first end to a second end, and the second end is an unsupported free end.

* * * * *